United States Patent
Hartemann et al.

(10) Patent No.: US 6,345,058 B1
(45) Date of Patent: Feb. 5, 2002

(54) CHIRPED PULSE INVERSE FREE-ELECTRON LASER VACUUM ACCELERATOR

(75) Inventors: Frederic V. Hartemann, Dublin; Hector A. Baldis, Pleasanton; Eric C. Landahl, Walnut Creek, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/576,016

(22) Filed: May 23, 2000

Related U.S. Application Data

(60) Provisional application No. 60/135,591, filed on May 24, 1999.

(51) Int. Cl.⁷ .................................................. H01S 3/00
(52) U.S. Cl. ............................................. 372/2; 372/69
(58) Field of Search ........................................ 372/2, 69

(56) References Cited

U.S. PATENT DOCUMENTS 5,789,876 A * 8/1998 Umstadter et al. .......... 315/507

\* cited by examiner

*Primary Examiner*—Leon Scott, Jr.
(74) *Attorney, Agent, or Firm*—I. E. Carnahan; Alan H. Thompson

(57) ABSTRACT

A chirped pulse inverse free-electron laser (IFEL) vacuum accelerator for high gradient laser acceleration in vacuum. By the use of an ultrashort (femtosecond), ultrahigh intensity chirped laser pulse both the IFEL interaction bandwidth and accelerating gradient are increased, thus yielding large gains in a compact system. In addition, the IFEL resonance condition can be maintained throughout the interaction region by using a chirped drive laser wave. In addition, diffraction can be alleviated by taking advantage of the laser optical bandwidth with negative dispersion focusing optics to produce a chromatic line focus. The combination of these features results in a compact, efficient vacuum laser accelerator which finds many applications including high energy physics, compact table-top laser accelerator for medical imaging and therapy, material science, and basic physics.

17 Claims, 3 Drawing Sheets

6,345,058 B1

CHIRPED PULSE INVERSE FREE-ELECTRON LASER VACUUM ACCELERATOR

RELATED APPLICATION

This application relates to U.S. Provisional Application No. 60/135,591 filed May 24, 1999, and claims priority thereof.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to free-electron lasers, particularly to the use of an inverse free-electron laser (IFEL) as a viable vacuum laser acceleration process, and more particularly to using an ultrahigh intensity chirped laser pulse whereby the dephasing length can be increased considerably, thus yielding high gradient IFEL acceleration, and which results in a compact, efficient vacuum laser accelerator.

The inverse free-electron laser interaction has been proposed as a viable vacuum laser acceleration process. See R. B. Palmer, J. Appl. Phys. 43, 3014 (1972); and E. D. Courant, et al., Phys. Rev. A32, 2813 (1985). Pioneering experimental work performed at Columbia University first demonstrated IFEL acceleration, see I. Wernick, et al., Phys. Rev. A46, 3566 (1992), and this was followed by experiments using a ns-duration gigawatt, $CO_2$ laser at Brookshaven National Laboratory, see A. Van Steenbergan, et al., Phys. Rev. Lett. 77, 2690 (1996). One of the fundamental limitations of the acceleration scheme is the dephasing of the trapped electron with respect to the drive laser wave: as the electron energy increases, the free-electron laser (FEL) resonance condition cannot be maintained, and the electron reaches a maximum energy given by the FEL interaction bandwidth. See T. C. Marshall, Free-Electron Lasers (McMillan Publishing Co., New York, N.Y. 1985) and C. W. Roberson and P. Sprangle, Phys. Fluids B1, 3 (1989).

The present invention involves the IFEL interaction in a different regime, using ultrashort, TW-class drive laser pulses which are now routinely generated by tabletop systems using chirped pulse amplification (see M. D. Perry, et al., Science 264,917 (1994). By the use of a chirped laser pulse, such allows the FEL resonance condition to be maintained beyond the conventional dephasing limit, thus further improving the electron energy gain. The ultrashort, high intensity chirped laser pulses thus generated provide an IFEL with high accelerating gradients (>GeV/m), in contrast with the longer pulse approaches previously considered. Thus, the dephasing problem of the prior IFEL approach is alleviated by using a chirped drive laser pulse.

SUMMARY OF THE INVENTION

It is an object of the present invention to alleviate the dephasing problem on inverse free-electron lasers.

A further object of the invention is to provide an inverse free-electron laser (IFEL) with a chirped drive laser pulse.

A further object of the invention is to provide a compact, efficient vacuum laser accelerator.

Another object of the invention is to provide a chirped pulse inverse free-electron laser vacuum accelerator.

Another object of the invention is to provide an IFEL with an ultrahigh intensity chirped laser pulse, whereby the dephasing length is increased, thus yielding high gradient IFEL acceleration.

Other objects and advantages of the present invention will become apparent from the following description and accompanying drawings. The present invention builds upon the inverse free-electron laser acceleration process. High gradient acceleration is normally precluded by the dephasing of the accelerated electron with respect to the drive laser pulse. In this invention the dephasing problem is alleviated by using a chirped drive laser pulse. In this manner, the frequency of the drive laser pulse remains resonant with the electron as it accelerates through the wiggler. This technique is similar to the use of a tapered wiggler but it is an all-optical arrangement which is more flexible and easier to implement. In addition this invention allows for more control over the acceleration and permits staging of the interaction to achieve high energies. Thus, this invention results in a compact, efficient IFEL vacuum laser accelerator.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1A:
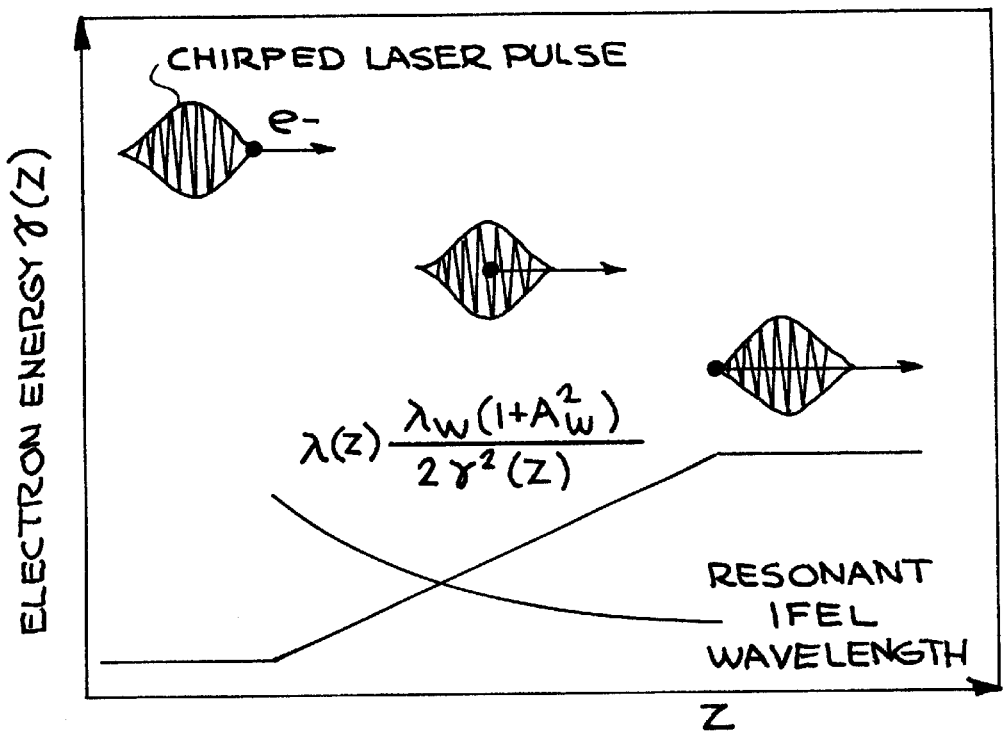
FIG. 1A is a schematic of the chirped pulse IFEL acceleration approach.

The present invention is directed to a chirped pulse inverse free-electron laser (IFEL) vacuum accelerator. By using an ultrahigh intensity (intensity of >$10^{17}$ W/cm$^2$ for visible wavelengths) chirped laser pulse, the dephasing length can be increased considerably, thus overcome the dephasing problems of prior IFEL systems, and thereby yielding high gradient (gradient in excess of 1 GeV/m) IFEL acceleration. This invention results in a compact, efficient vacuum laser accelerator. In the IFEL of this invention, the use of a chirped drive laser pulse enables the frequency of the drive laser pulse to remain resonant with the electron as it accelerates through the wiggler. This technique of this invention is similar to the use of a tapered wriggler but it is an all-optical scheme which is more flexible and easier to implement. In addition this invention allows for more control over the acceleration and permits staging of the interaction to achieve high energies. Using a chirped pulse and negative dispersion focusing optics permits one to take further advantage of the laser optical bandwidth and produce a chromatic line focus maximizing the gradient. Thus, the invention provides a compact system capable of accelerating pico second (ps) electron bunches with high gradient (GeV/m) and low energy spread.

As pointed out above, the IFEL interaction has been proposed as a viable vacuum laser acceleration process. One of the fundamental limitations of this acceleration scheme is the dephasing of the trapped electron with respect to the drive laser wave: as the electron energy increases, the free-electron laser (FEL) resonance condition cannot be maintained, and the electron reaches a maximum energy given by the FEL interaction bandwidth.

The following description of the present invention sets forth preliminary theoretical and computational information of the IFEL interaction involving ultrashort, TW-class drive laser pulses using chirped pulse amplification (CPA). For such femtosecond (fs) laser pulses, the IFEL interaction bandwidth is considerably wider than in the case of lower intensity drive pulses with duration in the ps–ns range: essentially, the well-known EEL resonance condition indicates that when the electron slips over one laser optical cycle, it also propagates over one wiggler period; thus, for the fs pulses considered here, the wiggler interaction region is extremely short, and the IFEL resonance bandwidth correspondingly wide. This directing translates into the fact that the electron energy can now vary significantly before the IFEL interaction detunes and saturates; in addition, the ultrahigh laser pulse intensity yields a high accelerating gradient. Therefore, the IFEL interaction physics is expected to change dramatically for broadband (fs) drive laser pulses near the so-called relativistic intensity regime ($>10^{16}$ W/cm$^2$ for optical wavelengths). A chirped laser pulse allows the FEL resonance condition to be maintained beyond the conventional dephasing limit, thus further improving the electron energy gain. Again, we note that such laser pulses are easily produced using the CPA technique which allows the generation of fs, multi-TW optical pulses, with tabletop laser systems operating at modest energies (in the 100 mJ range). We will show that the ultrashort, high intensity laser pulses thus generated make it possible to design an IFEL with high accelerating gradients ($>1$ GeV/m), in contrast with the longer pulse approaches previously considered.

Figure 1B:
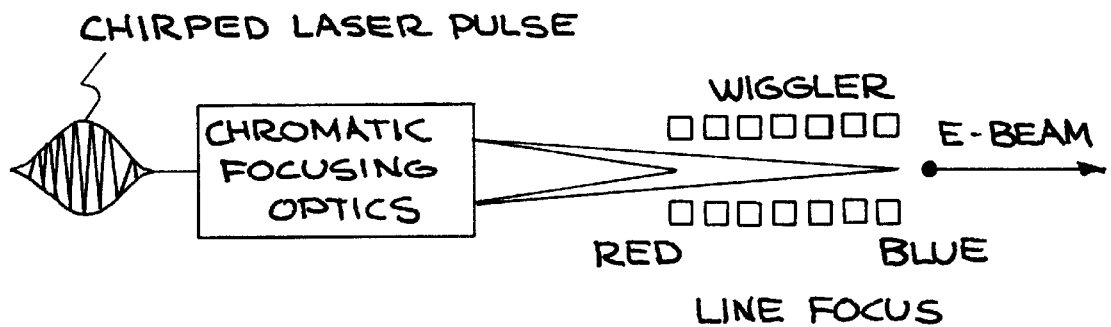
FIG. 1B is a schematic of the chirped pulse IFEL of the present invention, showing the negative dispersion, chromatic line focus.

Another practical limitation of IFEL accelerators is the diffraction of the drive laser pulse. In the conventional beam geometry, optical guiding cannot be used because the phase shift of the IFEL interaction has the opposite sign of the FEL phase shift which results in the well-known guiding effect. This can be alleviated by taking advantage of the ultrawide optical bandwidth of the chirped laser pulse: negative dispersion focusing optics can be used to produce a chromatic line focus, where long wavelengths are focused first, while the shorter wavelengths required to maintain the FEL resonance condition at higher energies are focused further along the interaction region. The combination of these features results in a compact, efficient vacuum laser accelerator, relying on CPA and the IFEL concept, as illustrated schematically in FIGS. 1A and 1B.

Since the accelerating IFEL bucket is very wide compared to plasma-based laser acceleration schemes: we find that for a 1 ps FWHM Gaussian electron bunch, and a 1 cm-period wiggler, the IFEL energy spread is <0.9%. This is extremely advantageous for a practical laser accelerator, as the device can be driven by a conventional rf photoinjector.

The following is a brief discussion of the vacuum acceleration approach which can be given by considering the well-known FEL resonance condition, $$\lambda \approx \frac{\lambda_w(1+A_w^2)}{2\gamma^2}$$

where $\lambda$ is the drive laser wavelength, $\lambda_w$ is the wiggler period, $$A_w = \frac{eB_w\lambda_w}{2\pi m_0 c}$$

is the normalized vector potential of the wiggler, and $\gamma$ is the electron energy. Here, the laser radiation pressure is neglected. It is clear that, as the electron energy increases during the IFEL acceleration process, resonance cannot be maintained, thus saturating the interaction and limiting the energy gain. In particular, the higher the accelerating gradient, the faster dephasing occurs; however, for fs laser pulses, this is balanced by the increased interaction bandwidth. To maintain resonance, it has also been proposed to taper the wiggler amplitude, $B_w$, or the wiggler period, $\lambda_w$. By contrast, in the approach of this invention, the drive laser wavelength $\lambda$, decreases as the electron gains energy, thus further alleviating the dephasing problem.

A short theoretical analysis is now $$E_\perp = -\frac{\partial A_\perp}{\partial \tau} = -\frac{dA_l}{d\phi}, B_\perp = \nabla \times A_\perp = \hat{z}\left(E_\perp + \frac{dA_w}{dz}\right)$$

presented of the chirped pulse IFEL interaction. In this analysis, length is measured in units of the central laser wavelength, $$\frac{1}{k_0} = \frac{\lambda_0}{2\pi},$$

time in units of the laser frequency, $$\frac{1}{\omega_0},$$

mass in units of $m_0$, and charge in units of e. For the sake of simplicity, plane waves are considered. With this, the combined 4-potential of the drive laser pulse, $A_l(\phi)$, and wiggler magnetic field, $A_w(z)$, is given by $$A\mu=(\psi,A_\perp,A_z),\psi=A_z=0,A_\perp(x,t)=A_l(\phi)+A_w(z), \quad (1)$$

where we have introduced the phase of the traveling laser wave, $\phi=k_\mu x^\mu=t-z$. The corresponding electromagnetic field components are $$E_\perp = -\frac{\partial A_\perp}{\partial \tau} = -\frac{dA_l}{d\phi}, B_\perp = \nabla \times A_\perp = \hat{z}\left(E_\perp + \frac{dA_w}{dz}\right). \quad (2)$$

Neglecting radiation reaction, the Lorentz force equation governs the evolution of the electron 4-velocity, $$u_\mu = \frac{dx_\mu}{d\tau},$$

where $\tau$ is the electron proper time. We thus have, for the transverse motion, $$\frac{du_\perp}{d\tau} = -(\gamma E_\perp + \hat{z} u_z \times B_\perp) = (\gamma - u_z)\frac{dA_l}{d\phi} + u_z \frac{dA_w}{dz},$$

where we recognize the light-cone variable, $$\kappa = \frac{dA_l}{d\phi} = \gamma - u_z.$$

Eq. (3) is readily integrated to yield the transverse momentum invariant: $u_\perp = A_l(\phi) + A_w(z)$.

$$\frac{dk}{d\tau} = \frac{d}{d\tau}(\gamma - u_z) = -u_\perp \cdot E + u_\perp \times B_\perp = u_\perp \cdot \frac{dA_w}{dz}$$

The evolution of the electron energy and axial momentum are given by $$\frac{d\gamma}{d\tau} = -u_\perp \cdot E_\perp = \frac{1}{2}\frac{dA_l^2}{d\phi} + A_w \cdot \frac{dA_l}{d\phi}, \quad (4)$$

$$\frac{du_z}{d\tau} = -u_\perp \times B_\perp = \frac{1}{2}\frac{dA_l^2}{d\phi} + \frac{1}{2}\frac{dA_w^2}{dz} - A_l \cdot \frac{dA_w}{dz} - A_w \cdot \frac{dA_l}{d\phi}, \quad (5)$$

where we recognize the laser radiation pressure (ponderomotive potential)

$$\frac{dA_l^2}{d\phi},$$

and the IFEL interaction terms, involving the nonlinear product of he laser and wiggler vector potentials. In the case of a helically polarized wiggler with constant amplitude, $$\frac{dA_w^2}{dz}$$

is identically zero, and the IFEL gradient is given by $$\frac{d\gamma}{dz} = \frac{d\gamma}{d\tau}\frac{d\tau}{dz} = \frac{A_w}{u_z} \cdot \frac{dA_l}{d\phi}$$

thus showing that high gradients can be obtained by using ultrahigh-intensity drive laser pulses, where both the normalized laser and wiggler vector potentials approach unity.

The equation governing the evolution of the light-cone variable is obtained by subtracting the axial force equation from the energy equation, to yield $$\frac{dk}{d\tau} = \frac{d}{d\tau}(\gamma - u_z) = -u_\perp \cdot E + u_\perp \times B_\perp = u_\perp \cdot \frac{dA_w}{dz}. \quad (6)$$

Using the result obtained for the transverse momentum, and for a helical wiggler, Eq. (6) reduces to $$\frac{d\kappa}{d\tau} = A_l \cdot \frac{dA_w}{dz}.$$

This equation is particularly simple and it shows that if either the wiggler or the laser field is zero, the light-cone variable is invariant. The axial momentum and energy are expressed in terms of the light-cone variable as $$\gamma = \frac{1 + A_\perp^2 + k^2}{2k}, u_z = \frac{1 + A_\perp^2 - k^2}{2k}\gamma = \frac{1 + A_\perp^2 + k^2}{2k}, u_z = \frac{1 + A_\perp^2 - k^2}{2k}. \quad (7)$$

Since $$\lim_{\phi \to \pm\infty} |A_l(\phi)| = 0 \text{ and } \lim_{z \to \pm\infty} |A_w(z)| = 0,$$

it is clear that the electron will have a net energy gain only if the light-cone variable is larger at the end of the interaction. We also note that during the interaction the energy can be increased locally by the laser radiation pressure or the IFEL interaction.

It proves useful to consider the electron phase as the independent variable:

$$\frac{dk}{d\phi} = \frac{dk}{d\tau}\frac{d\tau}{d\phi} = \frac{d}{d\tau}[ln\ k] = \frac{A_l}{k} \cdot \frac{dA_w}{dz}, \quad (8)$$

and the electron position is given by $$x_\mu(\phi) = \int_0^\phi \frac{u_\mu}{\kappa}(\psi)d\psi.$$

Because we are considering ultrashort chirped drive laser pulses, nonlinear slippage must be taken into account; it is given by the axial component of the electron position.

Based on the theoretical model described above, we have developed a simple one-dimensional nonlinear computer code which follows the evolution of the light-cone variable as a function of the electron phase within the drive laser pulse. Specifically, the vector potential of the laser if modeled by a circularly polarized plane wave with a linear chirp, α

$$A_l(\phi) = A_{0g}(\phi)[\hat{x}\sin(\phi + \alpha\phi^2) + \hat{y}\cos(\phi + \alpha\phi^2)]. \quad (9)$$

The pulse envelope is chosen as $$g(\phi) = \sin^2\left[\frac{\phi}{\Delta\phi}\right],$$

which closely approximates a Gaussian near the maximum, and has a finite duration. Here $\Delta\phi$ is the pulse FWHM, measured in units of $1/\overline{\omega}_0$, $A_0$ is the amplitude of the laser pulse measured in units of $$\frac{m_0 c}{e}.$$

The helical wiggler field is simply given by $A_w(z) = A_w[\hat{x}\sin(k_w z) + \hat{y}\cos(k_w z)]$ where the wiggler wavenumber is given in the units chosen here by $$k_w = \frac{\lambda_0}{\lambda_w}.$$

The position of the electron in the wiggler is given by $$z(\phi) = \int_0^\phi \frac{u_z}{\kappa}(\psi)d\psi.$$

Finally, in order to increase the accuracy of the code, a second order Runge-Kutta algorithm is used:

$$\frac{d^2k}{d\phi^2} = \frac{1}{k}\left[\frac{dAl}{d\phi} \cdot \frac{dAw}{dz} - k_w^2\frac{dz}{d\phi}(A_l \cdot A_w) - \left(\frac{dk}{d\phi}\right)^2\right]. \quad (10)$$

Figure 2A:
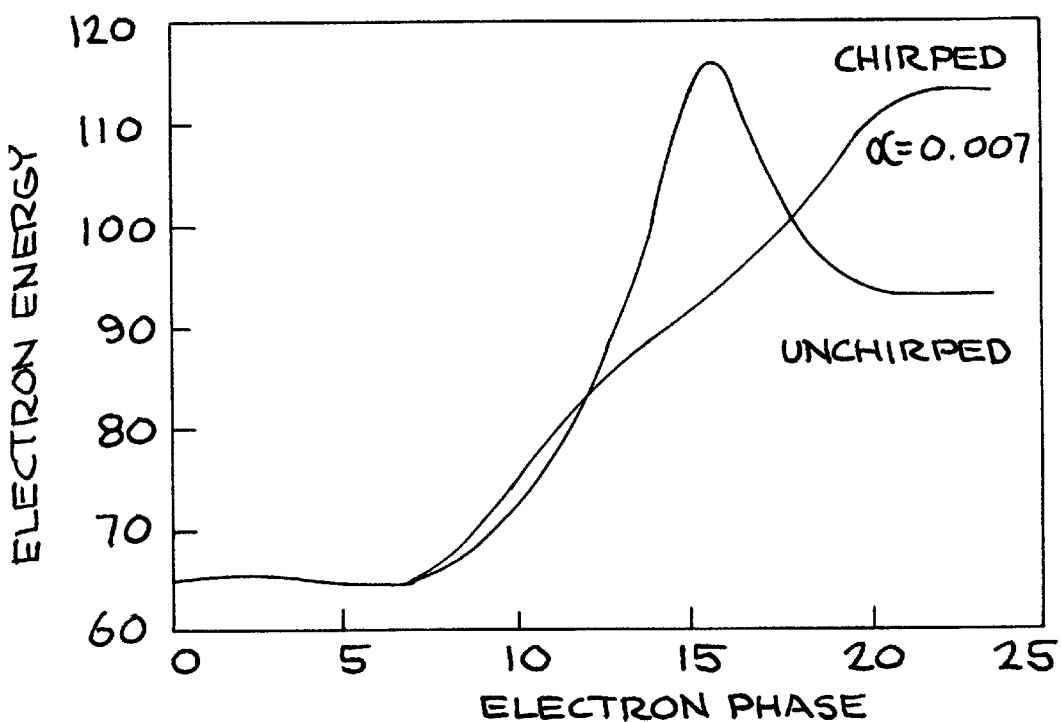
FIG. 2A graphically illustrates electron normalized energy as a function of its phase within the drive laser pulse, for the chirped and unchirped pulse, with $A_0=0.2$, 10 fs FWHM, $\lambda_0=0.8$ $\mu$m, $B_w=2$ kG, $\lambda_w=1$ cm, and $Y_0=65$.
Figure 2B:
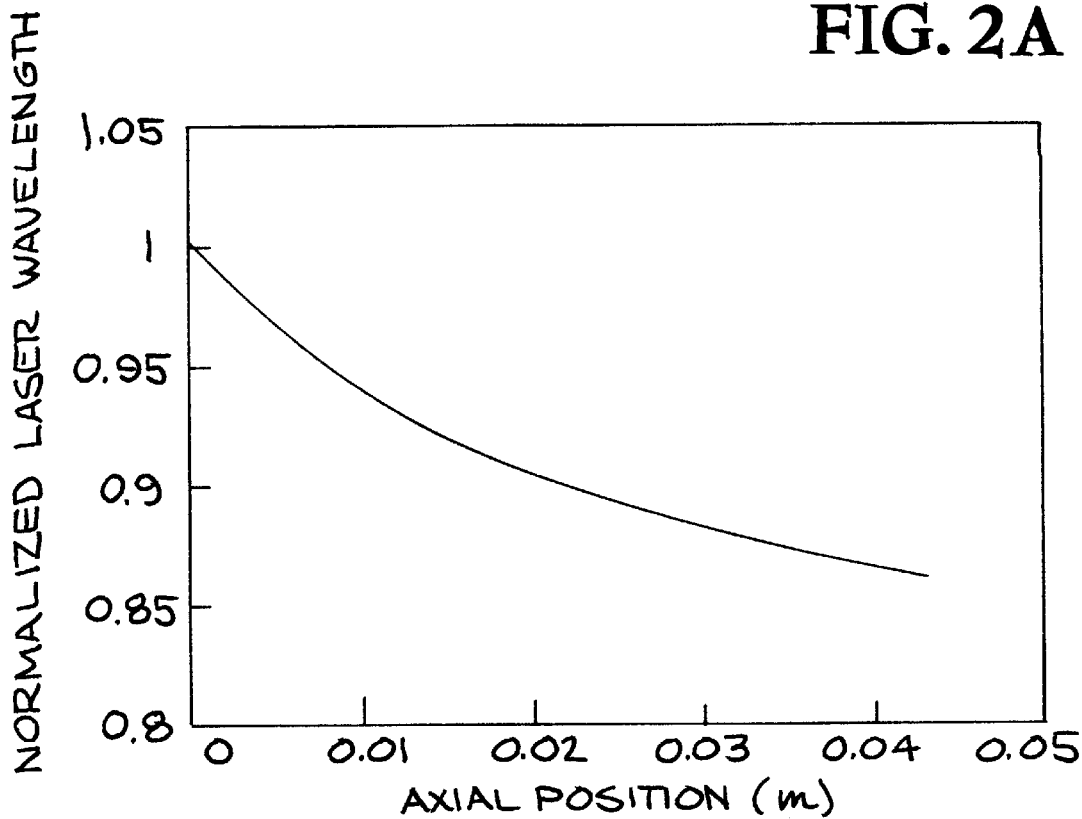
FIG. 2B graphically illustrates normalized chirped pulse wavelength as a function of position in the interaction region.

To demonstrate the relevance of the chirped pulse IFEL concept, we have ran the code for the following parameters: the normalized vector potential of the drive laser pulse is $A_0=0.2$, the pulse duration is 10 fs, the central laser wavelength is $\lambda 0=0.8$ μm, the wiggler field is $B_w=2$ kG, its period is $\lambda_w=1$ cm, and the injection energy is $\gamma_0=65$, while the resonant IFEL interaction energy is $\gamma^*=80$. The results are shown in FIG. 2A for both an unchirped laser pulse, and an optimally chirped laser pulse, where $\alpha=0.007$. In the first case, the electron clearly detunes away from the IFEL resonance, and exits the interaction region with an energy gain corresponding to an average acceleration gradient of 0.343 GeV/m. This number is still quite high because we are using an ultrashort laser pulse with a high focused intensity: the intensity can be expressed as $$I_0 = \left(\frac{A_0}{\lambda_0}\right)^2\left(\frac{2\pi^2\varepsilon_0 m_0^2 c^5}{e^2}\right) = \left(\frac{A_0}{\lambda_0}\right)^2 13.68 \, GW,$$

which corresponds to $I_0=8.55\times10^{16}$ W/cm$^2$ for these parameters. At this point, it is important to understand that attempts to decouple the electron at its peak energy will result in a severe loss of beam quality. In the second case, the IFEL resonance is maintained throughout the interaction region, and the electron energy now corresponds to an average gradient of 0.567 GeV/m, or a 65% increase over the unchirped case. More importantly, in this case, no extraction scheme is required, thus preserving the accelerated beam quality. The normalized wavelength of the chirped pulse is given as a function of the electron position in the wiggler by plotting $$\frac{1}{1+\alpha\phi} \text{ versus } z(\phi),$$

as shown in FIG. 2B. The relative optical bandwidth of the chirp is found to be 15%, which corresponds to 120 nm of spectral width. The bandwidth of the 10 fs pulse, including the additional 15% chirp, is therefore approximately 200 nm, or 5 fs transform-limited duration. This value has been demonstrated experimentally for Ti:Al$_2$O$_3$ systems.

The parameters discussed above can be translated into experimental parameters by assuming a long cylindrical focus for the drive laser pulse: using a Rayleigh range $$z_0 = \pi\frac{w_0^2}{\lambda_0} = 2 \, cm,$$

the focal waist is $w_0=71.4$ μm. The peak laser power is $P_0=I_0\pi w_0^2=I_0\lambda_0 z_0=13.7$ TW and the laser pulse energy is $W_0=P_0\Delta t=137$ mJ; this is much lower than the tens of Js commonly used in rf systems to power accelerating sections of a few tens of MeVs. In fact, it is interesting to compare the energy in the drive laser pulse to the kinetic energy acquired by a 1 nC electron bunch in the IFEL: we find that the energy transferred to the beam is 22.7 mJ, or 16.6% of the laser energy. This shows that the IFEL can be significantly loaded, which is key to efficient acceleration. It is also interesting to evaluate the radius of the electron trajectory in the helical wiggler: we have $$k_w r_\perp = \frac{u_\perp}{u_\parallel} \leq \frac{A_w}{\gamma_0}$$

and the wiggler parameter $A_w=0.18$; therefore, $r_\perp=4.4$ μm$<<w_0$ and the one-dimensional model should appropriately describe the IFEL interaction.

Clearly this represents an unoptimized scenario, as a linearly polarized laser and wiggler and a slab focus could be used; in addition, it is important to note that the intensity of the laser along the focal region can be maximized by using an optical scheme that provides a chromatic line focus. The long wavelength part of the pulse is focused closer to the optics, with the shorter wavelengths focused further down. This could be accomplished in a number of ways, using either reflective, refractive, or diffractive optics.

An interesting and simple approach is to use a Fresnel zone plate, which will produce the required $$\left(\frac{d\lambda}{dz}\right)$$

to match the computer calculation presented earlier. This approach is expected to relax the drive laser energy requirement by one order of magnitude.

Figure 3A:
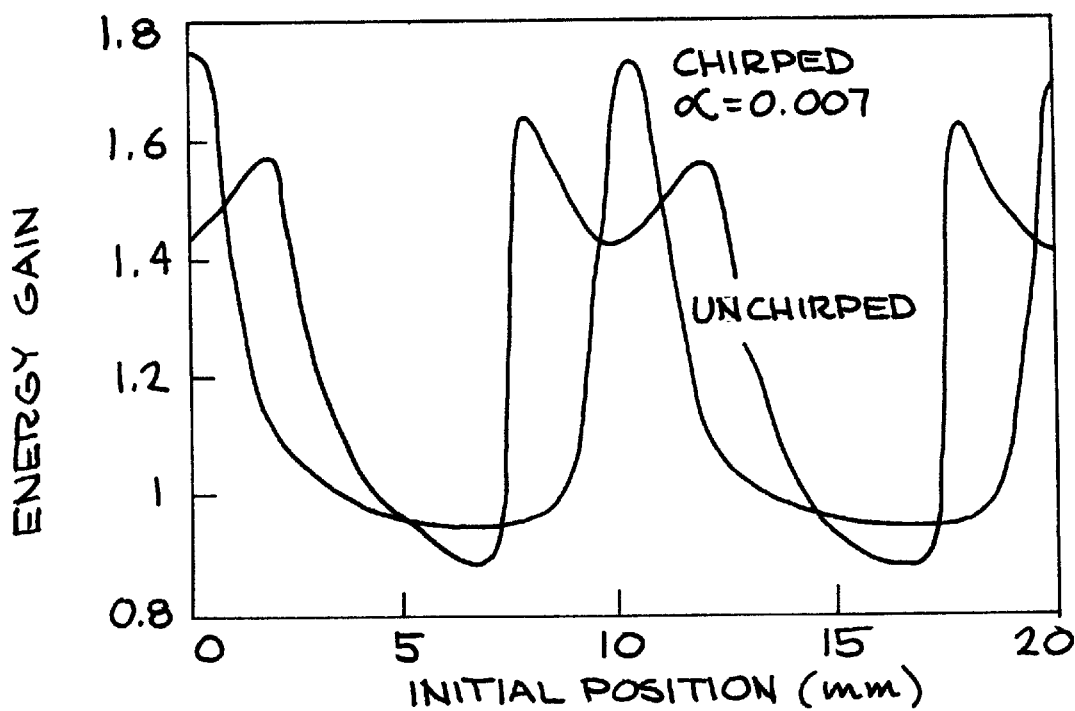
FIG. 3A graphically illustrates IFEL energy gain verses initial electron position in the wiggler.
Figure 3B:
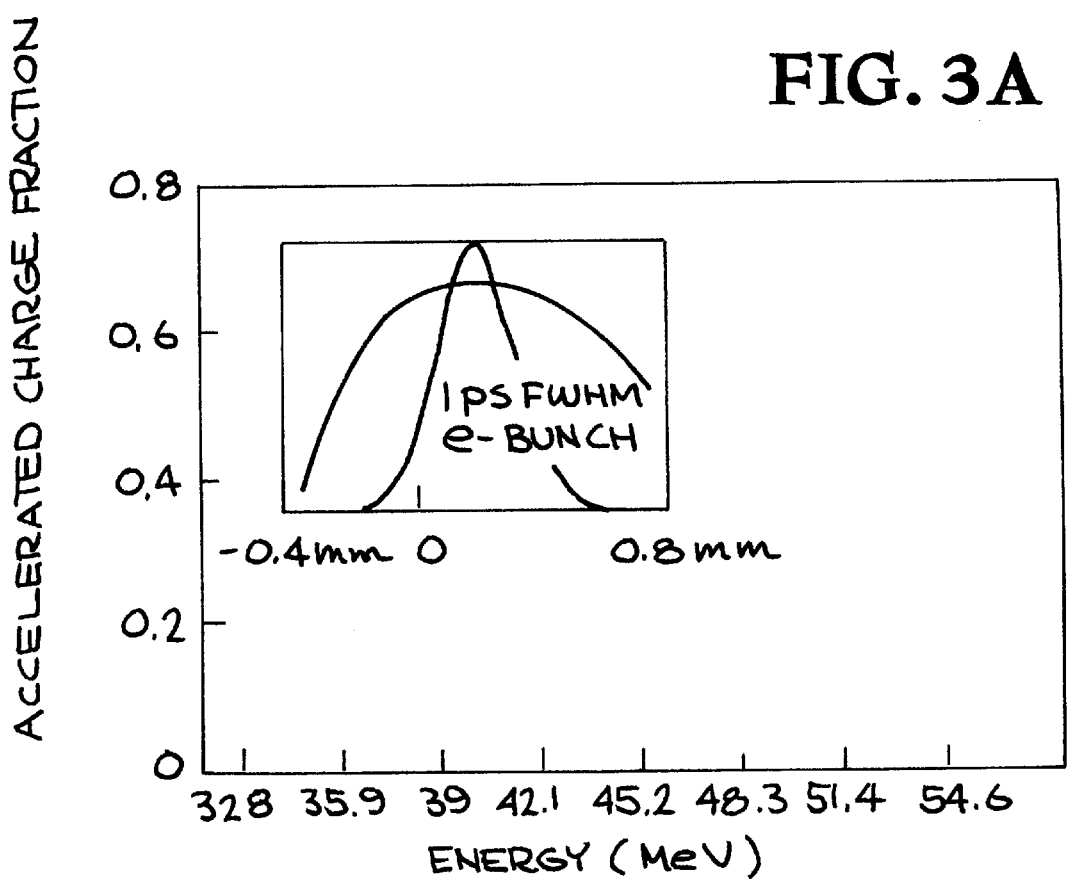
FIG. 3B graphically illustrates IFEL output energy spectrum for a 1 nC, 1 ps FWHM Gaussian electron bunch injected at the optimum phase angle, with the insert showing the initial electron bunch charge density and IFEL energy as a function of the initial position.

A detailed evaluation has been performed of the acceptance of the IFEL accelerating bucket. This is shown in FIG. 3A, where the IFEL energy gain is given as a function of the initial position in the wiggler, which is defined as the point where the laser pulse overtakes the electron [$z(\phi=0)$]. The periodicity, which is clearly seen, results from the one-dimensional nature of our model: in the absence of diffraction, the IFEL is invariant by translation of $\lambda_w$. The width of the energy peak, in the chirped case, is seen to be approximately 2 mm FWHM. The fact that the IFEL bucket scale is given by the wiggler period directly results from the fast-wave nature of the IFEL interaction. This number is extremely large compared to the accelerating bucket in a laser-plasma system, which is roughly equal to a tenth of the plasma wavelength (typically, in the μm range); this number is also compatible with conventional rf injectors, as is demonstrated in FIG. 3B. Here, we inject a 1 ps FWHM Gaussian electron bunch into the IFEL, at the optimum phase (0.2 mm) for maximum energy gain, as shown in the insert; the output electron energy spectrum is then computed, and we find 90% of the accelerated charge in a 0.5 MeV energy bin at 57.8 MeV; this represents an energy spread, 0.9%. The 32.8 MeV, 1 ps electron bunch injected in the IFEL could be produced by a plane wave transformer linac (PWT) very similar to that currently developed by DULY Research, Inc. Finally, we note that the IFEL resonance condition indicated that high-energy (TeV) scaling is possible, at least in principle: assuming that the wiggler magnetic field scales linearly with the wiggler wavelength, and using a value of $\chi=2$ kG/cm for the scaling, which is compatible with the current technology, the resonance condition can be recast as $$\gamma \approx \left(\frac{\lambda_w}{\lambda^*}\right)^{5/2},$$

where $$\lambda^* = \left(2\pi\frac{\lambda_0}{r_0}\frac{m_0}{\varepsilon_0\chi^2}\right)^{1/5} = 3.4066 \text{ mm};$$

here, $r_0 = 2.8178 \times 10^{-15}$ m, the resonant IFEL energy is 0.754 TeV. Naturally, parasitic effects, such as synchrotron radiation losses, must be taken into account to further assess the high-energy scalability of the chirped-pulse IFEL.

It has been shown that the invention provides a new approach for high gradient laser acceleration in vacuum: the chirped pulse IFEL. The essential feature is to use an ultrashort (fs), ultrahigh intensity laser pulse to increase both the IFEL interaction bandwidth and accelerating gradient, thus yielding large energy gains in a compact system. In addition, it has been shown that the IFEL resonance condition can be maintained throughout the interaction region by using a chirped drive laser wave, where the accelerated electron first interacts with the red part of the spectrum, and then progressively with the blue end of the spectrum as it slips nonlinearly within the phase of the drive pulse. The relevance of this invention has been demonstrated by using a one-dimensional nonlinear code indicating that accelerating gradients near 1 GeV/m are predicted with modest laser and beam parameters, and that the use of a chirped pulse results in a 65% improvement of the average gradient. In addition, we have performed a detailed analysis of the acceptance of the IFEL accelerating bucket and found that it is wider than the plasma-wakefield accelerating potential well by two to three orders of magnitude; as a result, ps electron bunches can be accelerated with extremely low energy spread, as opposed to the fs bunches required by most laser-plasma acceleration schemes. Finally, it has been suggested how diffraction could be alleviated by taking advantage of the laser optical bandwidth with negative dispersion focusing optics to produce a chromatic line focus. The combination of these features results in a compact, efficient vacuum laser accelerator.

While a particular approach for a proof-of-principle experiment of the invention has been illustrated along with various parameters, etc. to exemplify and explain the principles of the invention, such are not intended to be limiting. Modifications and changes may become apparent to those skilled in the art, and it is intended that the invention be limited only by the scope of the appended claims.

What is claimed is:

1. In an inverse free-electron laser vacuum acceleration process wherein high gradient acceleration is normally precluded by the dephasing of the acceleration electron with respect to the drive laser pulse, the improvement comprising:

alleviating the dephasing of the acceleration electron such that the frequency of the drive laser pulse remains resonant with the electron as it accelerates, and the alleviating of the dephasing of the acceleration electron is carried out using a chirped drive laser pulse.

2. The improvement of claim 1, additionally including providing the chirped drive laser pulse so as to have a high intensity of $>10^{17}$ W/cm$^2$ for visible wavelengths and a high acceleration gradient in excess of 1 GeV/m.

3. The improvement of claim 1, additionally including providing the chirped drive laser pulse with a frequency that remains resonant with an electron as it accelerates through a wiggler of an accelerator system.

4. The improvement of claim 1, additionally including providing the chirped drive laser pulse to enable control over the electron acceleration and permit staging of the interaction to achieve high energies.

5. The improvement of claim 1, additionally including providing the chirped drive laser pulse with femtosecond duration.

6. In an inverse free-electron laser vacuum accelerator, the improvement comprising:

means for alleviating the dephasing of an acceleration electron, said means comprising a drive laser for providing chirped drive laser pulses.

7. The accelerator of claim 6, wherein said chirped drive laser pulses are of a femtosecond duration.

8. The accelerator of claim 6, additionally including:

means for generating an electron beam, chromatic focusing optics mounted for receiving the electron beam, and a wiggler mounted to receive the electron beam from said chromatic focusing optics, the chirped drive laser pulses having a frequency that remains resonant with an electron of the electron-beam as the electrons accelerate through the wiggler.

9. The accelerator of claim 8, wherein the chirped drive laser pulses have an intensity in excess of $10^{17}$ W/cm$^2$, for visible wavelengths, and a duration of less than 100 femtoseconds.

10. The accelerator of claim 6, wherein said chirped drive laser pulses are of an intensity in excess of $10^{17}$ W/cm$^2$ for visible wavelengths.

11. In an inverse free-electron laser interaction in a vacuum laser acceleration process, the improvement comprising:

providing drive laser pulses, and providing the drive laser pulses with chirped pulse amplification.

12. The improvement of claim 11, wherein the chirped pulse is of a femtosecond duration.

13. The improvement of claim 12, wherein the chirped pulse is of an intensity in the range in excess of $10^{17}$ W/cm$^2$, for visible wavelengths.

14. In an inverse free-electron laser vacuum accelerator, the improvement comprising:

means for alleviating dephasing of an accelerated electron with respect to a drive laser pulse, said means including means for producing chirped pulse amplification of the drive laser pulse.

15. The improvement of claim 14, wherein said means for alleviating dephasing of an accelerated electron comprises an ultrashort, TV-class drive laser.

16. The improvement of claim 14, wherein the chirped drive laser pulses are of a duration of less than 100 femtoseconds, and of an intensity in excess of $10^{17}$ W/cm$^2$, for visible wavelengths.

17. The improvement of claim 14,, wherein the chirped drive laser pulses have a frequency which remains resonant with the electron as the electron accelerates through a wiggler of the accelerator.

* * * * *